(12) United States Patent
Fujimori et al.

(10) Patent No.: US 7,325,457 B2
(45) Date of Patent: Feb. 5, 2008

(54) SENSOR AND SENSOR MODULE

(75) Inventors: Tsukasa Fujimori, Kokubunji (JP); Natsuki Yokoyama, Mitaka (JP); Hiroshi Fukuda, Tokyo (JP); Yuko Hanaoka, Kodaira (JP); Takashi Azuma, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/492,961

(22) Filed: Jul. 26, 2006

(65) Prior Publication Data

US 2007/0068266 A1 Mar. 29, 2007

(30) Foreign Application Priority Data

Sep. 26, 2005 (JP) .............................. 2005-277895

(51) Int. Cl.
*G01L 9/12* (2006.01)
(52) U.S. Cl. ............................ 73/724; 73/753; 73/754; 361/283.1; 361/283.3
(58) Field of Classification Search .......... 73/700–756; 361/283.1–283.4
See application file for complete search history.

(56) References Cited

U.S. PATENT DOCUMENTS 4,720,852 A * 1/1988 Siligoni et al. ............. 379/124
5,883,550 A * 3/1999 Watanabe et al. ........... 331/176
7,190,941 B2 * 3/2007 Sorrells et al. ............. 455/296

FOREIGN PATENT DOCUMENTS

| JP | 05-322921 | 12/1993 |
|----|-----------|---------|
| JP | 2003-121457 | 4/2003 |

* cited by examiner

*Primary Examiner*—Edward Lefkowitz
*Assistant Examiner*—Jermaine Jenkins
(74) *Attorney, Agent, or Firm*—Antonelli, Terry, Stout & Kraus, LLP.

(57) ABSTRACT

A sensor and sensor module with small power consumption and high reliability are disclosed. The sensor includes a capacitor having a capacitance varying with a physical quantity, a capacitance-voltage conversion circuit for converting the capacitance of the capacitor into a voltage, and a control signal generation circuit for generating a plurality of control signals. The capacitor has a frequency-capacitance characteristic with a resonant frequency. In a measurement of the physical quantity, the capacitance of the capacitor is measured with one of the control signals having a first frequency which is much higher or much lower than the resonant frequency. In a self-diagnosis of the sensor, the capacitance of the capacitor is measured with another one of the control signals having a second frequency which is equal or close to the resonant frequency.

16 Claims, 10 Drawing Sheets

FIG. 1

1: SENSOR
2: CONDENSER
3: C-V CONVERSION CIRCUIT
4: CONTROL SIGNAL GENERATION CIRCUIT

SENSOR AND SENSOR MODULE

CLAIM OF PRIORITY

The present application claims priority from Japanese application JP 2005-277895 filed on Sep. 26, 2005, the content of which is hereby incorporated by reference into this application.

FIELD OF THE INVENTION

The present invention relates to a sensor and a sensor module and more particularly to a technique which can be effectively applied to a tire pressure monitoring system (TPMS).

BACKGROUND OF THE INVENTION

Disclosed in JP1993-322921A is a technique which performs a self-diagnosis of an electrostatic capacitive sensor having a movable electrode and a fixed electrode arranged to face each other, by applying an electrostatic force to the sensor to simulate deformation and vibration of the structure of the sensor resulting from a certain physical quantity so as to determine whether the sensor normally operates.

Also disclosed in JP2003-121457A is a technique which performs a self-diagnosis of a resonance-based capacitive (electrostatic capacitive) sensor by a measurement using a frequency higher than a resonant frequency to accurately carry out the self-diagnosis by avoiding an abrupt variation in sensor value (measured value) resulting from resonance.

SUMMARY OF THE INVENTION

However, conventionally, a high voltage is required for simulation of a physical quantity using an electrostatic force, disadvantageously resulting in an increase in power consumption of a sensor which operates with a battery.

Also, for example, in a pressure sensor which detects a variation in capacitance due to deformation of a movable electrode thereof, when a failure, such as the presence of a pin hole in the movable electrode or the adhesion of a foreign substance to the movable electrode, occurs in the movable electrode, the sensor value may represent a capacitance regarding a different pressure, not a capacitance expected with respect to the original pressure. For this failure, it is not possible to equalize the electrostatic force and the pressure, thus making the conventional self-diagnosis based on the electrostatic force imperfect. In addition, where a part of the movable electrode constituting the sensor fails, a variation in measured value resulting from this failure may be so small that the sensor may output an incorrect pressure using a wrong measurement result. In this case, it is difficult to perform the conventional self-diagnosis.

Moreover, there is a need to determine this failure by as simple and convenient means as possible without using complex methods.

Therefore, the present invention has been made in view of the above problems, and it is an object of the present invention to provide a sensor and sensor module with small power consumption and high reliability.

The above and other objects, features and other advantages of the present invention will be more clearly understood from the annexed drawings and the associated description.

The fundamental principle of the present invention will hereinafter be described briefly.

According to the present invention, because a capacitor has a frequency-capacitance characteristic with a resonant frequency, a normal measurement is performed to measure the capacitance of the capacitor with a control signal of a first frequency which is much higher or much lower than the resonant frequency, and a self-diagnosis is performed to measure the capacitance of the capacitor with a control signal of a second frequency which is equal or close to the resonant frequency.

In detail, in order to realize a technique for performing a self-diagnosis of characteristics of a sensor without using specific circuits or mechanisms, the following solutions are proposed. A measurement is carried out with respect to measurement frequency dependence of the capacitance of a capacitor in the vicinity of a resonant frequency of the capacitor. In general, the resonant frequency of the capacitor is determined depending on the size, material and structure of the capacitor and is sensitive to the state of a movable electrode of the sensor. That is, the resonant frequency may vary greatly or cause no resonance due to a state of the movable electrode, such as damage to the movable electrode, adhesion of a foreign substance to the electrode or sinkage of the electrode into liquid. As a result, when a failure or abnormality occurs in the movable electrode, the possibility that the resonant frequency will vary is high.

The frequency characteristics (frequency spectrum) of a capacitance between a movable electrode and a fixed electrode can be obtained from measurement of the capacitance under the condition of sweeping the frequency of a control signal (measurement pulse). A resonant frequency can be known on the basis of the fact that the frequency characteristics show a large variation in the vicinity of the resonant frequency. Since the resonant frequency varies with a failure or abnormality occurring in the movable electrode, a self-diagnosis can be performed with respect to whether a sensor is in a normal state or abnormal state, by pre-measuring the resonant frequency, or a frequency at which the movable electrode normally resonates, and determining whether there is a variation in the resonant frequency. By doing this self-diagnosis, it is possible to increase reliability of the sensor.

Further, in order to realize a technique for performing a self-diagnosis with small power consumption, the self-diagnosis can be carried out by the combination of the aforementioned resonant frequency-based technique and techniques to be hereinafter described.

Firstly, a plurality of movable electrodes are prepared on one substrate (chip) and a mechanism is provided to measure the capacitance of each of the movable electrodes. The movable electrodes have the same shapes and structures. A self-diagnosis is performed for failure determination by taking a measurement for each movable electrode and carrying out a statistical process with respect to the measurement results to examine an average and deviation thereof.

In this case, when the deviation is larger than a predetermined upper threshold value, any one of the movable electrodes is determined to have failed. In particular, when a sensor normally operates under the condition of being installed in an environment where vibration is serious, the deviation will be smaller than the upper threshold value. In this regard, even when the deviation is extremely small, namely, it is smaller than a predetermined lower threshold value, the possibility that a failure will occur is determined to be high.

Secondly, a voltage is applied to a capacitance between a movable electrode and fixed electrode of a sensor and the capacitance is measured under the condition that an electrostatic force is generated in the sensor. Then, the measured capacitance is compared with that before the voltage is applied. In this case, when there is no constant variation in the capacitance, the sensor is determined to have failed. It is preferable that a boosting circuit is provided to apply as high a voltage as possible.

Thirdly, a variation in capacitance measurement results with temperature is examined under the condition that the entire sensor is heated by a heater installed outside or inside of the sensor. In general, temperature-dependent factors, such as electrostatic capacitance, electric resistance, etc., are present in a sensor measuring a physical state. For this reason, temperature dependence is also present in the measurement results. A determination can be made as to whether the sensor has failed, by storing temperature dependence of a measurement result in the normal state of the sensor and comparing it with another one.

The present invention can obtain effects as will hereinafter be described briefly.

According to this invention, it is possible to realize a sensor and sensor module having a self-diagnosis function with small power consumption.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts, and a duplicate description thereof will be omitted.

First Embodiment

Figure 1:
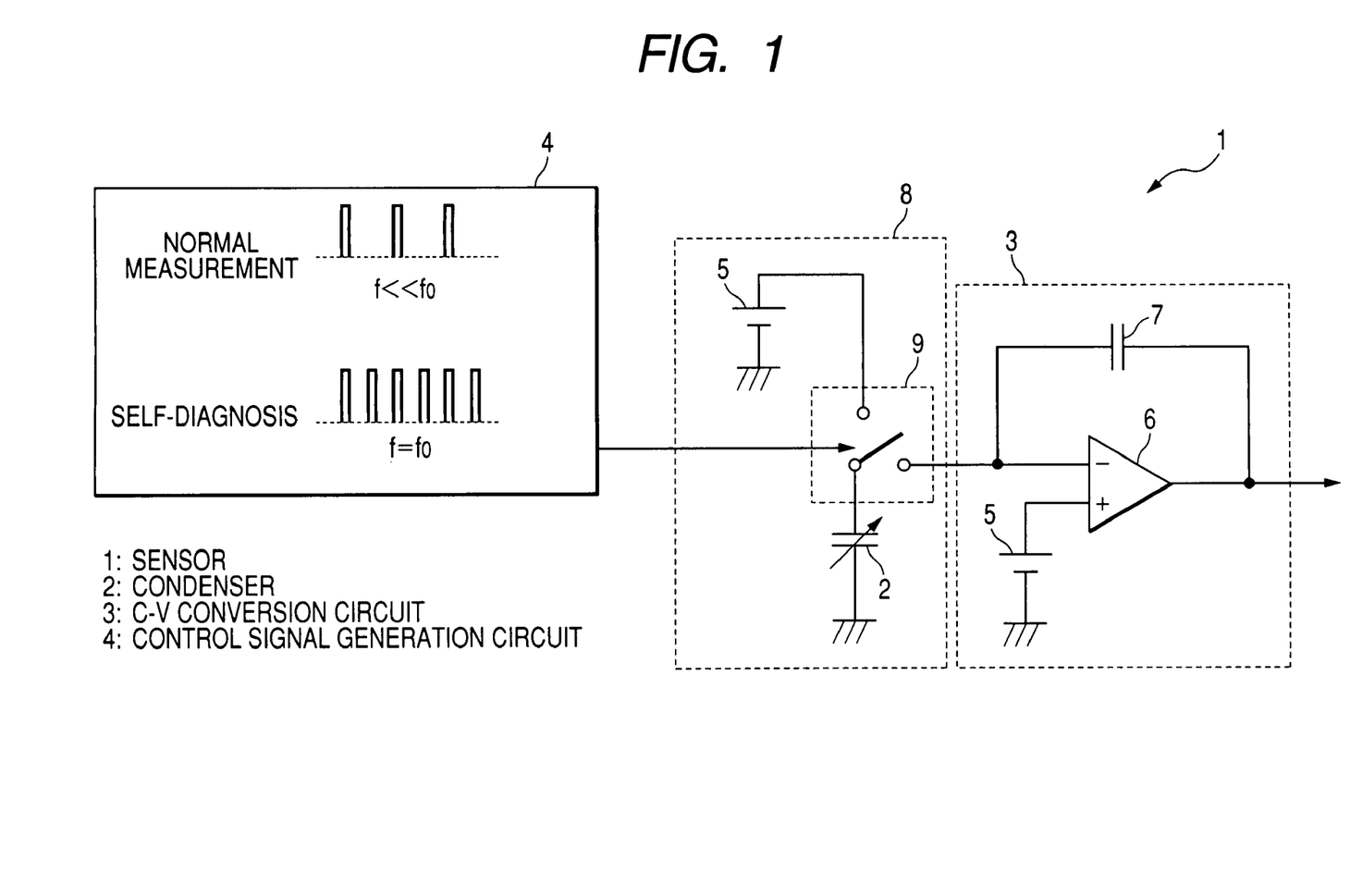
FIG. 1 is a circuit diagram showing the circuit configuration of a sensor according to a first embodiment of the present invention.

FIG. 1 is a circuit diagram showing the circuit configuration of a sensor according to a first embodiment of the present invention. As shown in FIG. 1, the sensor according to the first embodiment of the present invention, denoted by reference numeral 1, comprises a switched capacitor circuit 8 including a capacitor 2, a capacitance (C)-voltage (V) conversion circuit 3, and a control signal generation circuit 4. A voltage from a constant voltage source (battery) 5 is supplied to the sensor 1. Although not shown, a signal processing circuit including a low-pass filter (LPF) circuit and an amplifier circuit is disposed at an output side of the C-V conversion circuit 3 (an output terminal side of an operational amplifier 6) to extract and amplify only a signal component of a predetermined frequency band from an output signal from the C-V conversion circuit 3.

The capacitor 2 is a variable-capacitance capacitor whose capacitance varies with a physical quantity, as will be described later. This capacitor 2 has a fixed electrode installed on a substrate, and a movable electrode installed on a diaphragm to face the fixed electrode with a gap therebetween. The movable electrode is displaced with a variation in the physical quantity to form the capacitance with the fixed electrode. In the case where the physical quantity is a pressure, the capacitor 2 may be a pressure sensor.

The C-V conversion circuit 3 acts to convert the capacitance formed by the movable electrode and fixed electrode of the capacitor 2 into a voltage. To this end, the C-V conversion circuit 3 includes the operational amplifier (OP AMP) 6 and a capacitor 7. The OP AMP 6 has an inverting input terminal connected to the switched capacitor circuit 8 and also to an output terminal of the OP AMP 6 through the capacitor 7 in a feedback manner. The OP AMP 6 also has a non-inverting input terminal connected to the constant voltage source 5. This C-V conversion circuit 3 is a so-called "integration circuit".

The switched capacitor circuit 8 acts to transfer charges from the constant voltage source 5 to the capacitor 2 through switching of a switch 9. A switching frequency of the switch 9 is controlled by a control signal from the control signal generation circuit 4. The switch 9 may be implemented with, for example, a metal insulator semiconductor (MIS) transistor.

The control signal generation circuit 4 functions to output a control signal for control of a timing of voltage application to the fixed electrode of the capacitor 2 and a control signal for control of a switching timing of the switch 9. The control signal to the switch 9 may include, for example, normal measurement and self-diagnosis control signals as shown in FIG. 1. The switching between the normal measurement control signal and the self-diagnosis control signal may be performed on the basis of, for example, an internal clock of the control signal generation circuit.

In the sensor 1, as stated above, the switch 9 of the switched capacitor circuit 8 is switched in response to the switching timing control signal from the control signal generation circuit-4 to charge and discharge the capacitor 2, and the C-V conversion circuit 3 converts the amount of charges charged in the capacitor 2 into a voltage. Hereinafter, a description will be given on the assumption that the frequency of the control signal from the control signal generation circuit 4 for switching the charging/discharging of the capacitor 2 is f, the design value of a resonant frequency of the capacitor 2 is $f_0$, and a capacitance measured at the frequency f is C(f).

Figure 2:
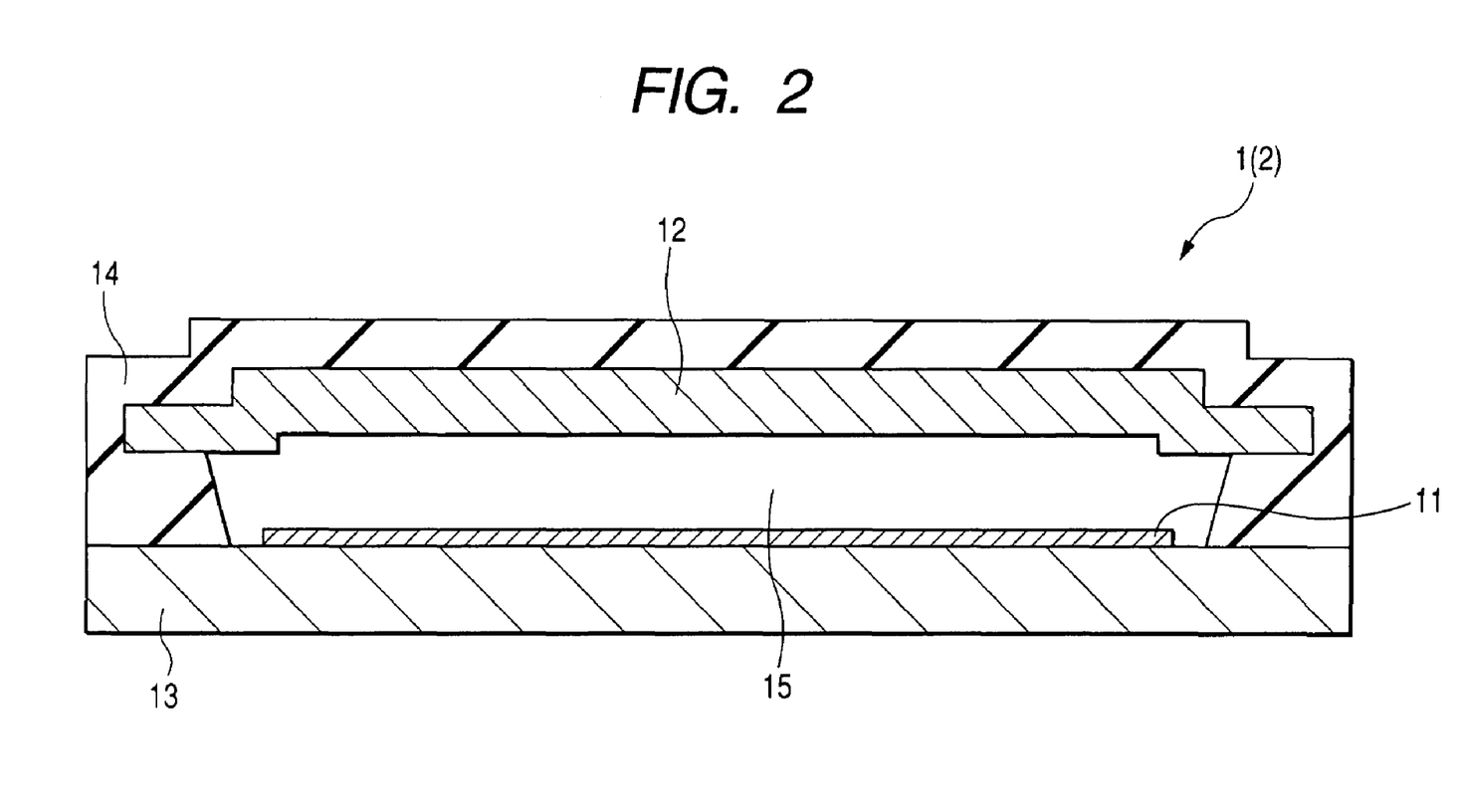
FIG. 2 is a schematic sectional view of main parts of the sensor according to the first embodiment of the present invention.

FIG. 2 is a schematic sectional view of main parts of the sensor 1 according to the first embodiment of the present invention, more particularly, main parts of the capacitor 2. The capacitor 2 includes a fixed electrode 11 formed on one surface of a substrate 13, a movable electrode 12 arranged to face the fixed electrode 11 with a cavity (gap) 15 therebetween and displaced with a variation in pressure (physical quantity), and a seal film 14 made of, for example, silicon oxide. The seal film 14 seals the fixed electrode 11, movable electrode 12, etc., and is elastically deformed when the movable electrode 12 is displaced. Thus, the movable electrode 12 and seal film 14 constitute a so-called "diaphragm". More stable measurement of physical quantity can be achieved by preparing a plurality of movable electrodes 12 on the same substrate 13, and preparing a mechanism for measuring each capacitance. In this case, the movable electrodes 12 are prepared to have the same shape and structure.

As described above, in the capacitor 2 of the first embodiment, the movable electrode (diaphragm) 12 is deformed by an external pressure (physical quantity), to cause a variation in capacitance, because the cavity 15 is present between the fixed electrode 11 and the movable electrode 12, and is sealed by the insulating seal film 14. That is, the capacitor 2 is a variable-capacitance capacitor (pressure sensor) which exhibits a variation in capacitance due to pressure.

The capacitor 2 is formed using a surface micro electro mechanical systems (MEMS) process. This surface MEMS process is a method for forming a thin film on a surface of, for example, a semiconductor substrate, by repeating deposition and patterning. A so-called "semiconductor manufacturing process technique" is applied to the surface MEMS process.

Hereinafter, a method for manufacturing the capacitor 2 will be described. First, on a substrate 13, which is made of, for example, silicon, a fixed electrode 11 is formed which is made of a conductive material, for example, tungsten (W), aluminum (Al), or tungsten silicon (WSi). Thereafter, a sacrificial layer made of, for example, polysilicon, is formed at a region which will become a cavity 15. A movable electrode 12, which is made of a conductive material, for example, W, Al, or WSi, is formed over the sacrificial layer. A seal film 14 is then deposited which is made of, for example, silicon oxide. Subsequently, an etching hole (not shown) is formed to reach the sacrificial layer. The sacrificial layer, which is made of polysilicon, is then removed through the etching hole in accordance with an etching process, to form the cavity 15. Thus, the capacitor 2 is completely formed. Meanwhile, although the fixed electrode 11 is formed on the substrate 12 in the first embodiment, it may be formed on a base. That is, for example, metal insulator semiconductor (MIS) transistors or an integrated circuit constituted by MIS transistors may be formed beneath the base.

The capacitor 2, formed by the surface MEMS process in the above manner, may be formed on the same substrate 13 along with the C-V conversion circuit 3 and control signal generation circuit 4, formed by the same semiconductor manufacturing process. That is, the capacitor 2, the C-V conversion circuit 3 and the control signal generation circuit 4 may be formed on one semiconductor chip.

Figure 3:
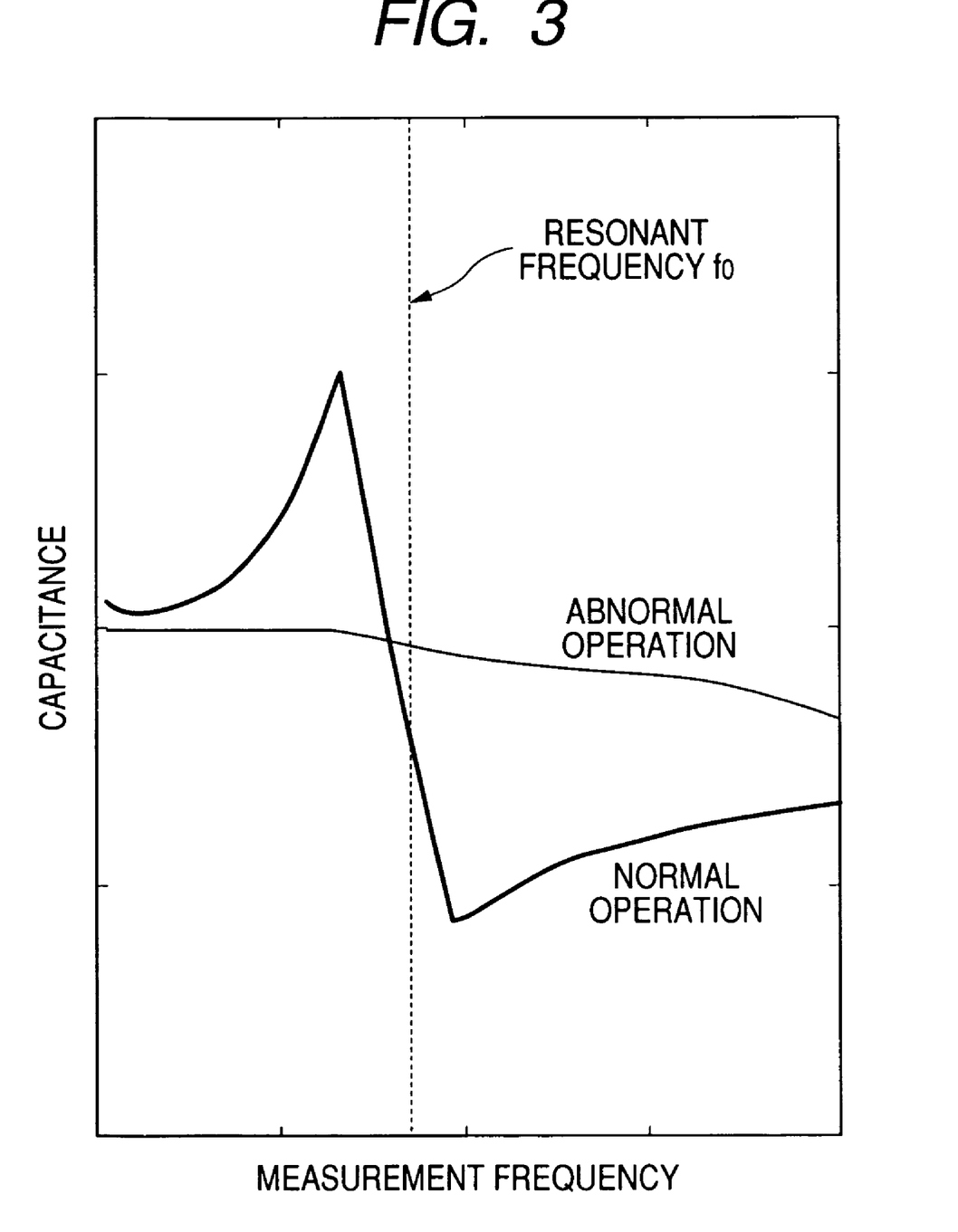
FIG. 3 is a graph illustrating a frequency-capacitance characteristic of a capacitor according to the first embodiment of the present invention.

FIG. 3 is a graph illustrating a frequency-capacitance characteristic of the capacitor 2 according to the first embodiment of the present invention. As shown in FIG. 3, when the capacitor 2 is in normal operation where it normally operates as a variable-capacitance capacitor, it shows a frequency characteristic with the resonant frequency $f_0$ (resonance). Because the resonant frequency $f_0$ is particularly determined depending on the size, material and structure of the movable electrode 12, the frequency-capacitance characteristic of FIG. 3 is nothing but an example. In contrast, when the capacitor 2 is in abnormal operation where a failure is present therein, it shows a frequency characteristic with the resonant frequency $f_0$ (resonance) varying. Using this characteristic, whether the sensor 1 with the capacitor 2 is in a normal state or abnormal state can be diagnosed by pre-measuring the resonant frequency $f_0$ where the movable electrode 12 normally resonates, and determining whether there is a variation in the resonant frequency $f_0$.

A self-diagnosis is performed for failure determination by taking a measurement for each movable electrode 12 and carrying out a statistical process with respect to the measurement results to examine an average and deviation thereof. In this case, when the deviation is larger than a predetermined upper threshold value, any one movable electrode 12 is determined to have failed. In particular, when the sensor normally operates under the condition of being installed in an environment where vibration is serious, the deviation will be smaller than the upper threshold value. In this regard, even when the deviation is extremely small, namely, it is smaller than a predetermined lower threshold value, the possibility that a failure will occur is determined to be high.

Figure 4:
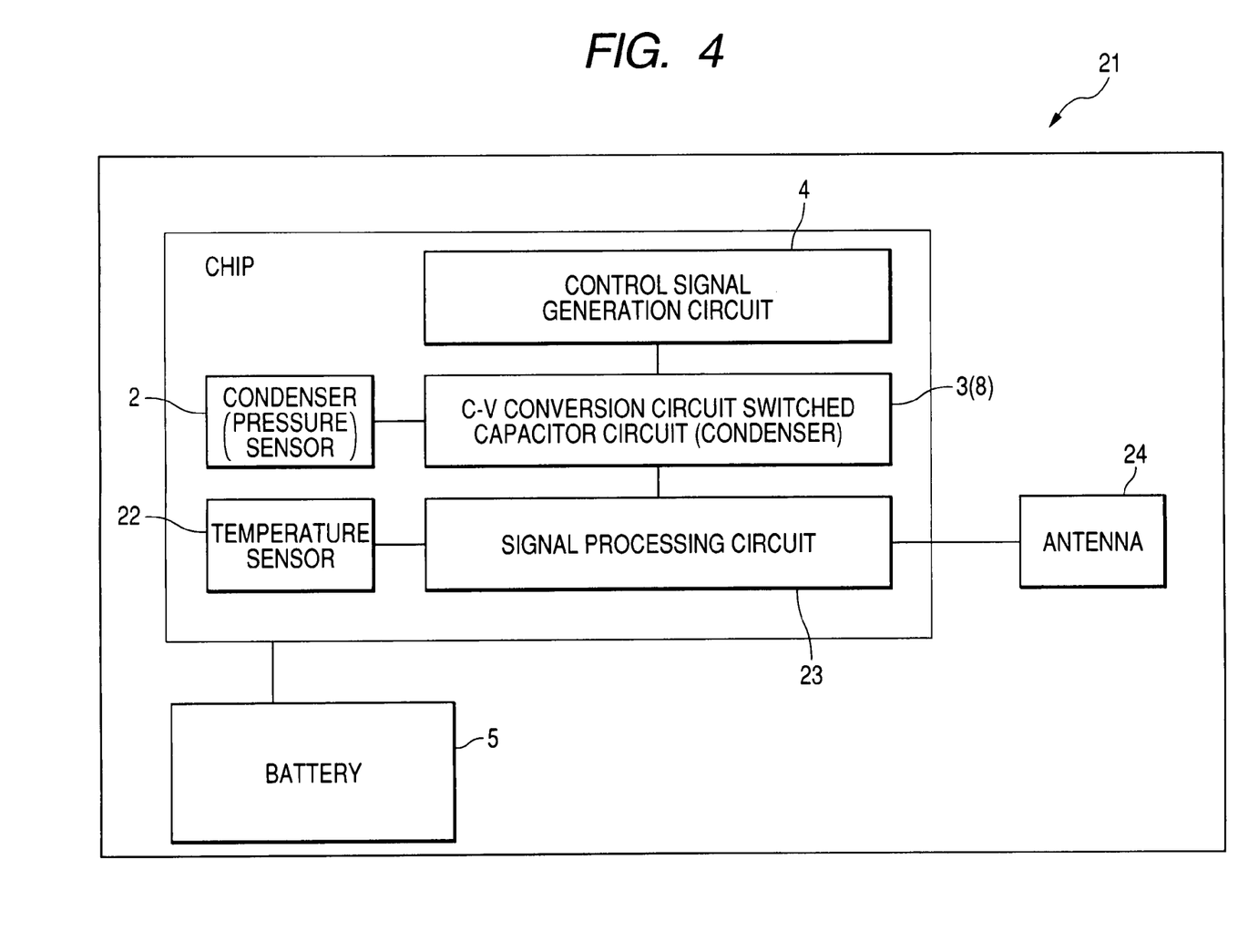
FIG. 4 is a block diagram showing the circuit configuration of a sensor module according to the first embodiment of the present invention.

FIG. 4 is a block diagram showing the circuit configuration of a sensor module 21 according to the first embodiment of the present invention. In this embodiment, the sensor module 21 is equipped with a sensor having the above-stated self-diagnosis function.

As shown in FIG. 4, the sensor module 21 comprises the capacitor 2, which may be a pressure sensor, the C-V conversion circuit 3 (switched capacitor circuit 8), the control signal generation circuit 4, a temperature sensor 22, a signal processing circuit 23, an antenna 24, and the constant voltage source (battery) 5. For example, this sensor module 21 may be constructed by installing, on a mount board, one chip on which the capacitor 2, C-V conversion circuit 3 (switched capacitor circuit 8), control signal generation circuit 4, temperature sensor 22 and signal processing circuit 23 are formed, a battery which is the constant voltage source 5, and a coil which is the antenna 24, and then packaging them. Alternatively, the capacitor 2, C-V conversion circuit 3 (switched capacitor circuit 8), control signal generation circuit 4, temperature sensor 22 and signal processing circuit 23 may not be formed on one chip. For example, the capacitor 2, C-V conversion circuit 3 (switched capacitor circuit 8), temperature sensor 22 and signal processing circuit 23 may be formed on one chip and the control signal generation circuit 4 may be formed on another chip.

The capacitor 2, C-V conversion circuit 3 (switched capacitor circuit 8), control signal generation circuit 4, signal processing circuit 23 and constant voltage source 5 are the same as those described previously. The temperature sensor 22 is used for temperature measurement, because temperature dependence is present in physical property values, for example, elastic moduli, of materials of the fixed electrode 11, movable electrode 12, etc. constituting the capacitor 2. The antenna 24 is used to transmit a signal indicative of an abnormality of the sensor module 21 to, for example, a control unit which is remote from the sensor module 21.

Figure 5:
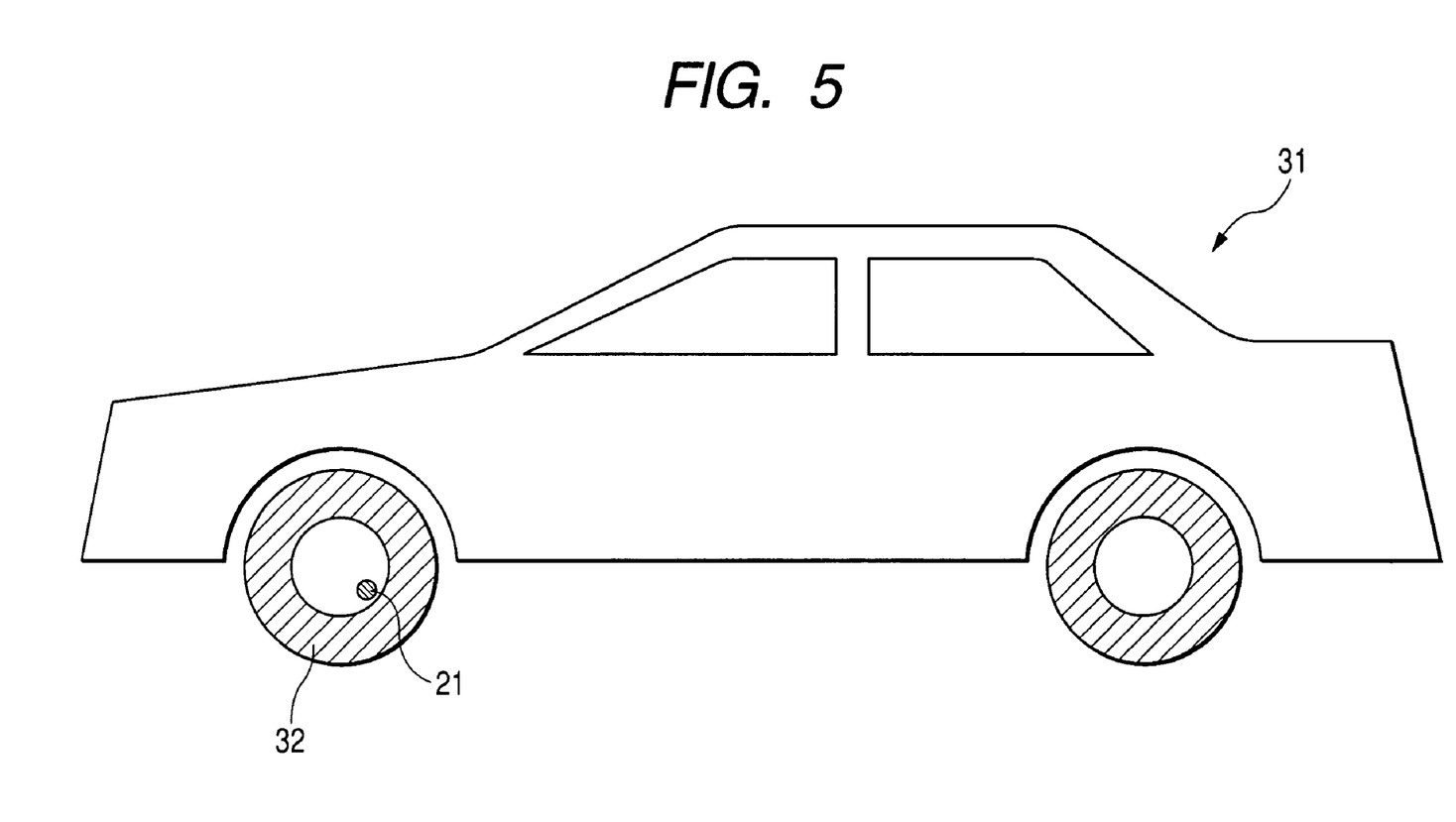
FIG. 5 is a side view illustrating application of the sensor module to a tire pressure monitoring system.

For example, the sensor module 21 may be used in a tire pressure monitoring system (TPMS). In this case, as shown in FIG. 5, the sensor module 21 is mounted on a portion of a valve of a tire 32 of a vehicle 31 to measure the air pressure of the tire 32. To monitor the air pressure of the tire is important for safe driving of the vehicle. In this regard, it is important to increase reliability of the sensor module which measures the air pressure of the tire, and the self-diagnosis function capable of confirming the normal operation is therefore required as in the sensor module 21 according to this first embodiment.

A description will hereinafter be given of the self-diagnosis of the sensor module 21. The self-diagnosis is performed at regular time intervals, or when a value suspected to be abnormal is measured during the normal measurement. In the normal measurement, the frequency f is set to be $f<<f_0$ (or $f_0<<f$) for the purpose of avoiding an effect on measurement results, caused by resonance.

As shown in FIG. 1, first, the normal measurement is performed under the condition that the frequency f is $f<<f_0$ (or $f_0<<f$), and the resulting capacitance C(f) is stored. Then, the frequency f is set to, for example, $f_0+a$, and a capacitance $C(f_0+a)$ is measured. Here, a is a constant on the order of, for example, 0 to 50 kHz, which represents a range within which the capacitance abruptly varies due to the resonance. In the normal operation where the resonance occurs at the resonant frequency $f_0$, a great variation as shown in FIG. 3 appears in the vicinity of $f_0$, so that $C(f_0+a)$ is not equal to C(f). In contrast, in the abnormal operation where the resonant frequency varies from $f_0$ due to a given factor, C(f) and $C(f_0+a)$ are almost equal. In this manner, a determination can be made as to whether the resonant frequency varies from the design value $f_0$. As a result, the self-diagnosis can be performed in such a way that the sensor module is determined to be in the normal operation if the resonance occurs and in the abnormal operation if no resonance occurs.

Alternatively, the self-diagnosis may be performed with respect to whether the sensor module is in the normal state or abnormal state, by pre-measuring and storing $C(f_0+a)$ under the condition that the sensor module is determined to be in the normal state, measuring $C(f_0+a)$ in a self-diagnosis mode and comparing it with the stored value. On the other hand, the comparison may not be performed with respect to only one point of $C(f_0+a)$. For example, a statistical comparison/determination may be made by measuring a plurality of points based on various values of a.

In the above-described self-diagnosis method, because a frequency characteristic can be acquired by merely changing the frequency of a signal sent from a controller (for example, the control signal generation circuit) such as a microcomputer, the measurement circuit will be subject to a minimum modification. Furthermore, the increase in the number of points to be measured or the frequency change can be advantageously made by merely changing a program in the controller. Therefore, according to the present invention, it is possible to provide a sensor and sensor module with small power consumption and high reliability.

In addition, the sensor structure, circuit configuration, system configuration, etc. are not limited to those in the present embodiment, but are applicable without departing from the scope and spirit of the invention.

Second Embodiment

According to a second embodiment of the present invention, a sensor and a sensor module are provided which perform a more reliable self-diagnosis by additionally combining a plurality of methods (self-diagnosis) with the resonant frequency-based method (self-diagnosis) described in the first embodiment. Further, the sensor is included in the sensor module as in the first embodiment. Hereinafter, a description of the second embodiment which duplicates the first embodiment will be omitted.

Figure 6:
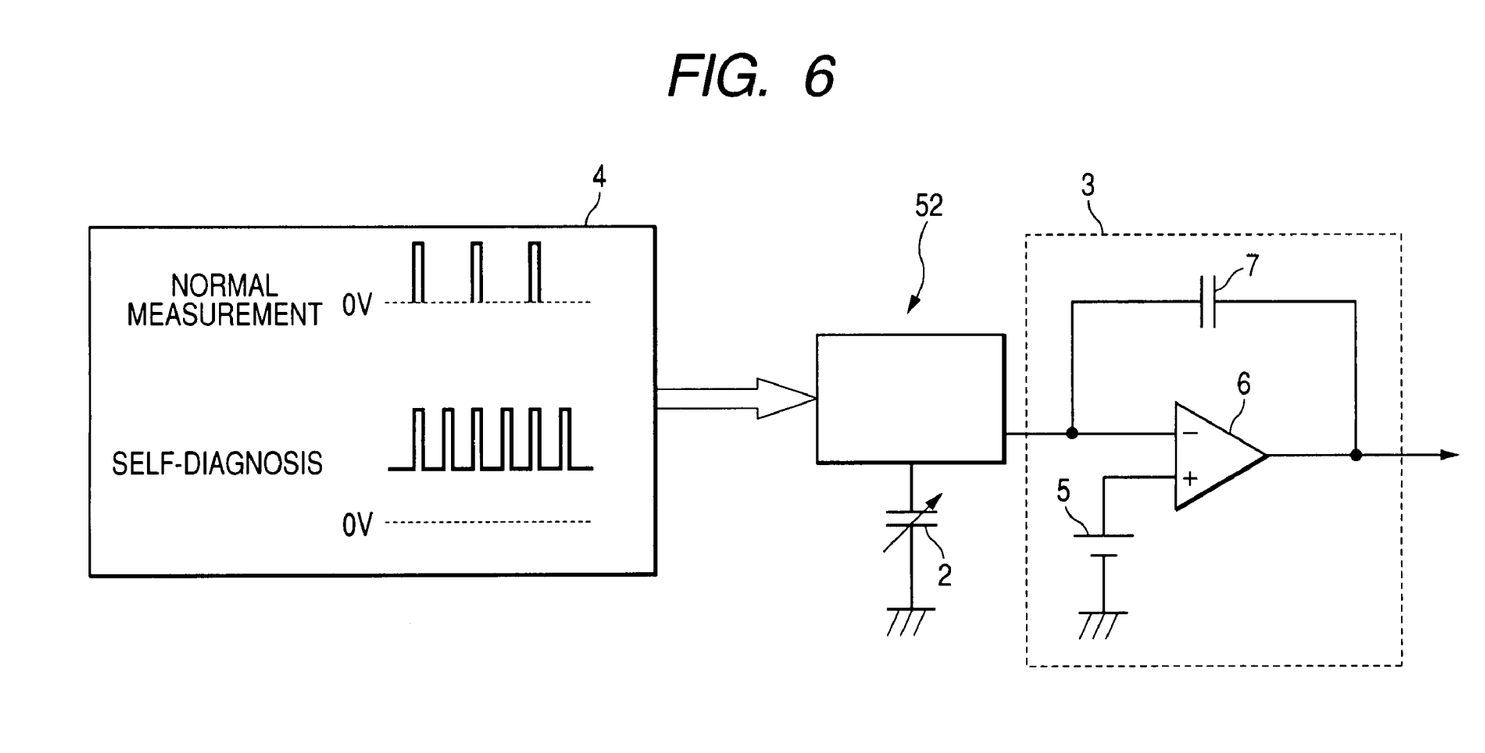
FIG. 6 is a circuit diagram showing the circuit configuration of a sensor according to a second embodiment of the present invention.

FIG. 6 is a circuit diagram showing the circuit configuration of the sensor according to the second embodiment of the present invention, denoted by reference numeral 51. As shown in FIG. 6, the sensor 51 comprises a signal application/switching circuit 52 including the capacitor 2, the C-V conversion circuit 3, and the control signal generation circuit 4. The signal application/switching circuit 52 includes a circuit for applying a constant voltage to the capacitor 2, in addition to the switched capacitor circuit of the first embodiment.

In the sensor 51, a control signal including a bias voltage in addition to the self-diagnosis control signal in the first embodiment is applied to the capacitor 2 for measurement of the capacitance thereof. To this end, the signal application/switching circuit 52 acts to switch the presence/absence of the bias voltage. Further, for detection of a variation in the capacitance, the bias voltage is preferably a high voltage, more preferably 5~30V. Moreover, because the capacitor 2 is formed by the surface MEMS process, it may be formed on the same semiconductor substrate (semiconductor chip) along with the C-V conversion circuit 3, etc. That is, the sensor 51 may be formed on one semiconductor chip. Alternatively, a plurality of sensors 51 may be formed on one semiconductor chip.

Figure 7:
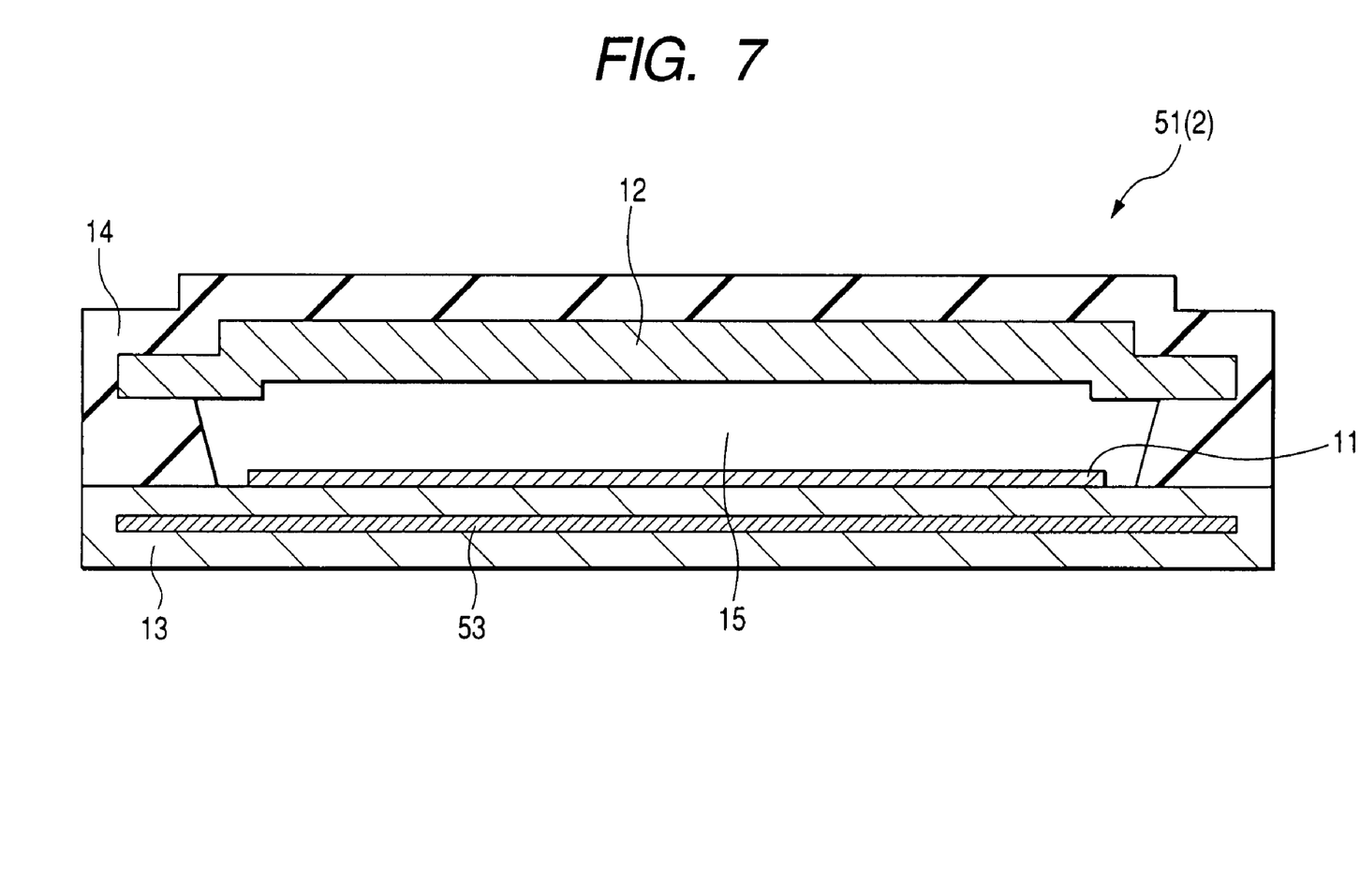
FIG. 7 is a schematic sectional view of main parts of the sensor according to the second embodiment of the present invention.
Figure 8:
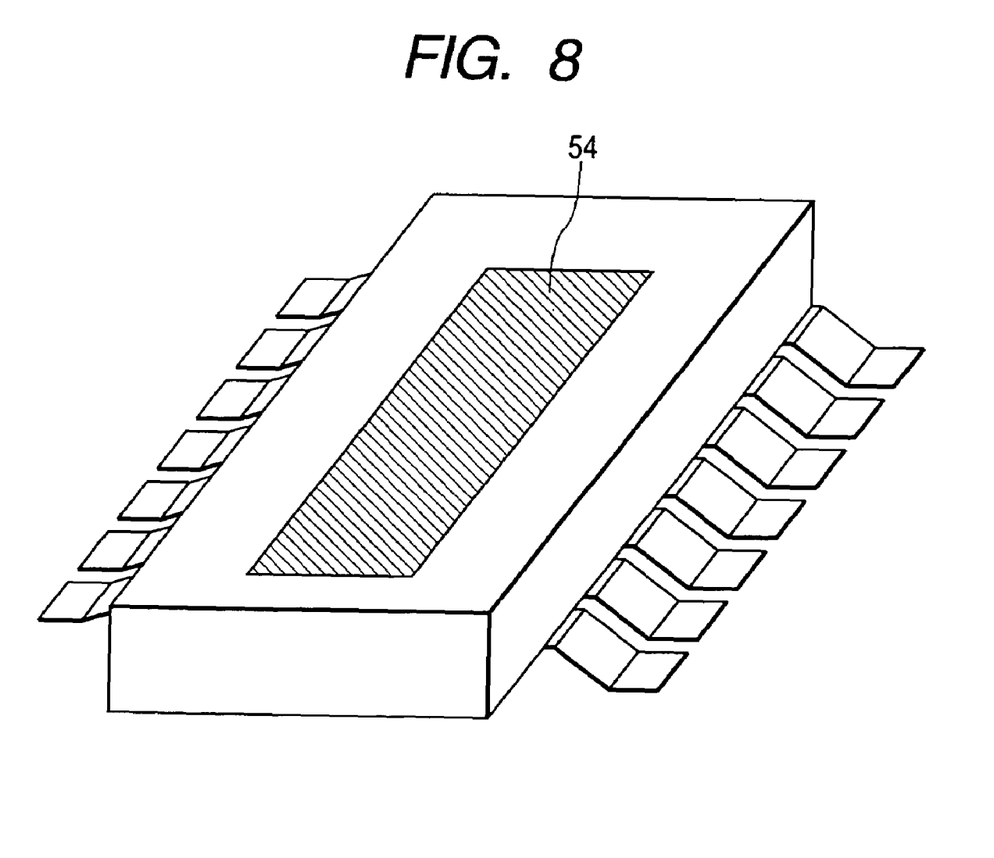
FIG. 8 is a schematic perspective view of a sensor module according to the second embodiment of the present invention.

FIG. 7 is a schematic sectional view of main parts of the sensor 51 according to the second embodiment of the present invention, more particularly, main parts of the capacitor 2. This capacitor 2 is substantially the same in configuration as that in the first embodiment, with the exception that a heater 53 is provided in the substrate 13. Although described later, the heater 53 is used to vary a temperature on the basis of the fact that the capacitance of the capacitor 2 has temperature dependence, so that a variation in the capacitance with the temperature can be measured and used for determination in the self-diagnosis. This heater may be installed at any place of the sensor 51 as long as it can heat the sensor 51 while saving as much energy as possible. Alternatively, in the case of a packaged sensor module 55, a heater 54 may be installed outside of a package of the sensor module 55 as shown in FIG. 8. FIG. 8 is a schematic perspective view of the sensor module according to the second embodiment of the present invention, namely, the packaged sensor module 55.

Figure 9:
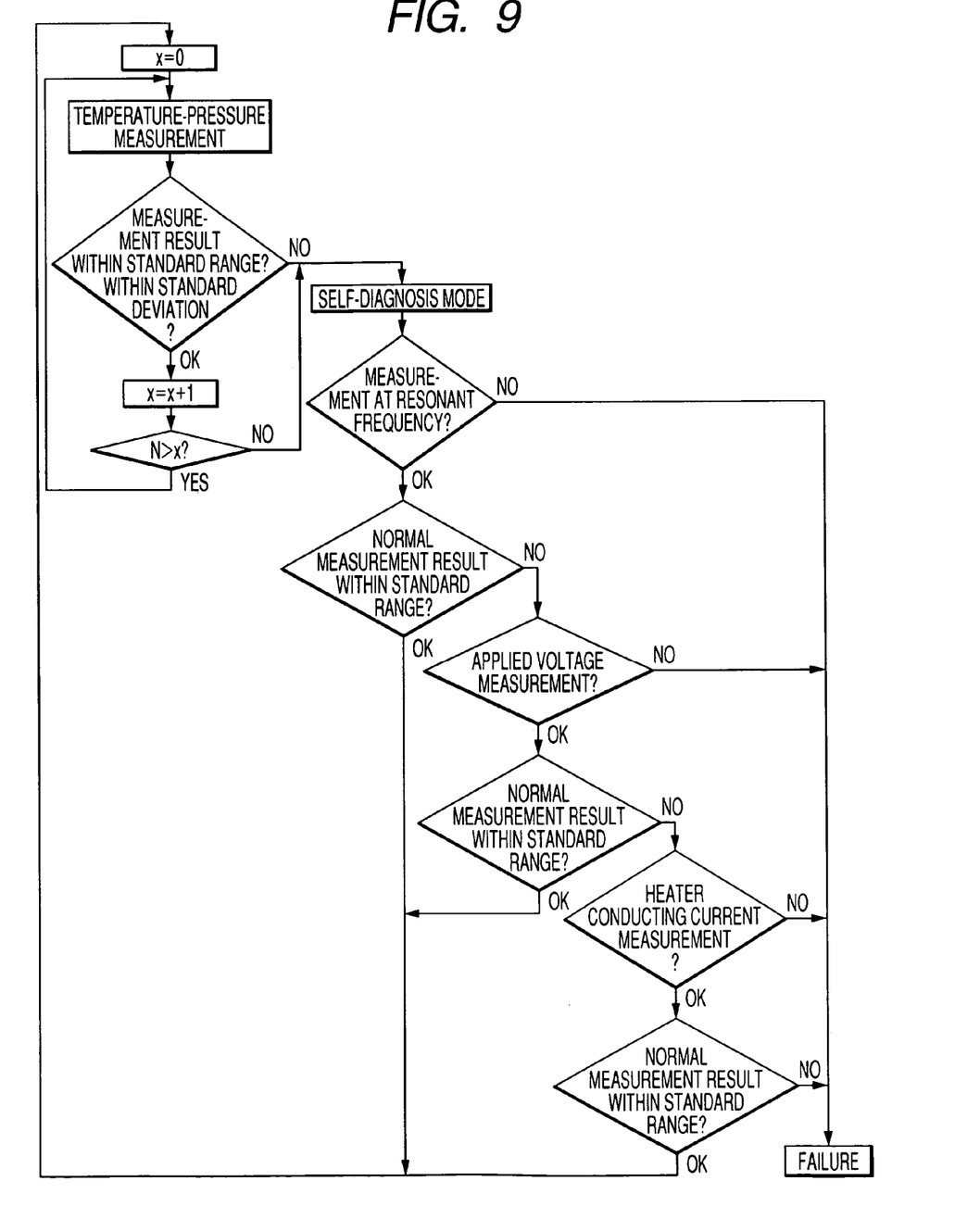
FIG. 9 is a flow chart illustrating a normal measurement and self-diagnosis according to the second-embodiment of the present invention.

FIG. 9 is a flow chart illustrating a normal measurement and self-diagnosis according to the second embodiment of the present invention. A self-diagnosis as to whether the sensor 51 according to the present second embodiment normally operates is performed according to the flow chart of FIG. 9. When, in the normal measurement, a measured value is beyond a standard range or the number x of executions of the normal measurement is N>x (where N is a constant), a self-diagnosis mode is entered to determine whether the sensor 51 is in an abnormal state. Alternatively, in the normal measurement, the values of a plurality of pressure sensors are measured and a statistical process is performed with respect to the measurement results to examine a deviation thereof. Then, when the deviation is above or below a predetermined value, the self-diagnosis mode is entered. In the self-diagnosis mode, self-diagnosis methods to be hereinafter described are sequentially examined. In the case where the sensor is diagnosed to be abnormal over all measurements, it is determined to have failed. Also, in the case where the sensor is diagnosed to be normal, the normal capacitance measurement is again performed and, if the measurement result indicates an abnormal (erroneous) state of the sensor again, the sensor is determined to have failed.

In the self-diagnosis mode, first, the self-diagnosis as in the first embodiment is performed and, when the sensor is determined not to be abnormal, the normal measurement is performed again.

Figure 10:
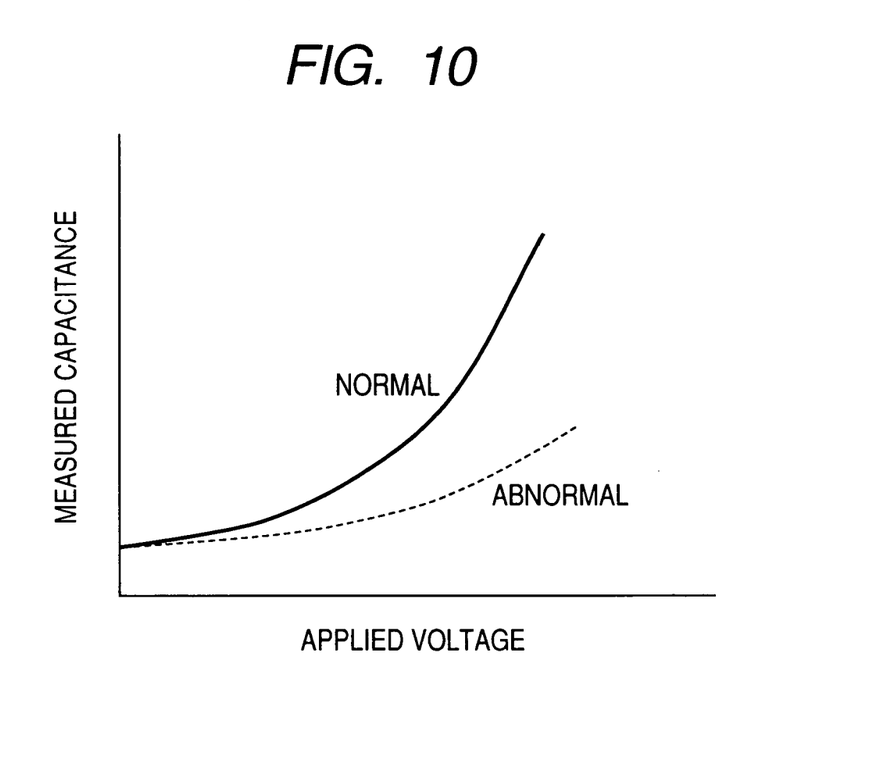
FIG. 10 is a graph illustrating voltage dependence of the capacitance of a capacitor according to the second embodiment of the present invention.

When the normal measurement result indicates an abnormal state of the sensor again, the capacitance measurement is carried out by applying a constant voltage, for example, a bias voltage of 12V, to the control signal (pulse output) of the resonant frequency used in the capacitance measurement. Because an electrostatic force is generated between the fixed electrode 11 and movable electrode 12 of the capacitor 2 due to the voltage application, the same deformation as that in the pressure application occurs in the capacitor 2, thereby causing the capacitance to be subject to a variation as shown in FIG. 10. FIG. 10 is a graph illustrating voltage dependence of the capacitance of the capacitor 2.

A determination may be made as to whether the deformation based on the electrostatic force is an expected value, by pre-measuring and storing a variation in the capacitance when the constant voltage is applied. In this case, when the deformation is not the expected value, a failure can be diagnosed to be present in the capacitor 2. Alternatively, a voltage may be applied to the capacitance between the movable electrode 12 and the fixed electrode 11 and the capacitance may be measured under the condition that the electrostatic force is generated in the sensor. In this case, the measured capacitance is compared with that before the voltage is applied. When there is no constant variation in the capacitance, the sensor is determined to have failed. It is preferable that a boosting circuit is provided in the sensor to apply as high a voltage as possible. Therefore, the sensor 51 of the present second embodiment is more reliable than the sensor of the first embodiment.

Figure 11:
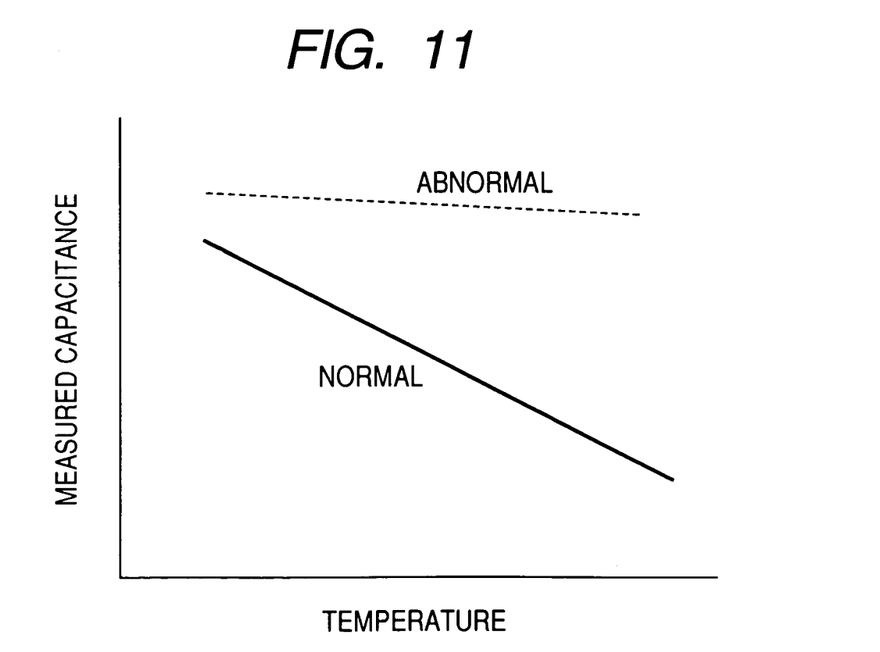
FIG. 11 is a graph illustrating temperature dependence of the capacitance of the capacitor according to the second embodiment of the present invention.

On the other hand, when the capacitor 2 is determined not to be abnormal, the normal measurement is performed again. When the normal measurement result indicates an abnormal state-of the capacitor 2 again, current is applied to the heater 53, thus heating the capacitor 2. Because temperature dependence is present in physical property values, for example, elastic moduli, of materials of the capacitor 2, the capacitor 2 shows a variation in temperature characteristic as shown in FIG. 11. FIG. 11 is a graph illustrating temperature dependence of the capacitance of the capacitor 2.

The capacitance of the capacitor 2 is measured under the condition that the capacitor 2 is heated in the normal operation, and the measurement result of the temperature characteristic of the capacitor 2 is then stored. As a result, in the self-diagnosis mode, provided that a temperature characteristic variation expected due to the heating by the heater 53 can be obtained, the capacitor 2 will be able to be diagnosed to be normal. In other words, a variation in capacitance measurement results with temperature is examined under the condition that the entire sensor is heated by the heater 53 installed inside (or outside) of the sensor. A determination is then made as to whether the sensor has failed, by storing temperature dependence of a measurement result in the normal state of the sensor and comparing it with another one. Accordingly, the sensor 51 of the present second embodiment is more reliable than the sensor of the first embodiment.

According to this second embodiment, it is possible to cope with unknown failure modes of the sensor 51, thereby making it possible to increase the reliability of the sensor 51 over the sensor of the first embodiment. That is, high reliability of the sensor 51 can be guaranteed by carrying out the self-diagnosis method which measures the capacitance under the bias voltage application, and, furthermore, the self-diagnosis method which measures the capacitance under the application of current to the heater 53, in addition to the resonant frequency-based self-diagnosis method of the first embodiment. In realizing this highly reliable sensor 51, the self-diagnosis methods are carried out sequentially from one with small power consumption to one with large power consumption, so that the self-diagnosis can be performed with minimum required power consumption. In other words, the self-diagnosis can be performed with minimum required power consumption by carrying out the self-diagnosis method which measures the capacitance under the bias voltage application, and, furthermore, the self-diagnosis method which measures the capacitance under the application of current to the heater, in addition to the resonant frequency-based self-diagnosis method of the first embodiment, as in the present second embodiment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

For example, although the self-diagnosis of the present invention has been disclosed in the above-described embodiments to be applied to a sensor with a capacitor whose capacitance varies with pressure, it may be applied to an electrostatic MEMS ultrasonic transducer (probe). This electrostatic MEMS ultrasonic transducer is also formed using a semiconductor substrate comprising, for example, silicon by a semiconductor processing technique. Moreover, the self-diagnosis method of the present invention is also applicable to an acceleration sensor, an angular velocity sensor, an ultrasonic sensor and other physical quantity sensors measuring a capacitance.

The present invention is widely used in sensors requiring high reliability.

What is claimed is:

1. A sensor comprising:
   a capacitor having a capacitance varying with a physical quantity;
   a capacitance-voltage conversion circuit that converts the capacitance of the capacitor into a voltage; and
   a control signal generation circuit that generates a plurality of control signals,
   wherein the capacitor has a frequency-capacitance characteristic with a resonant frequency,
   wherein, in a measurement of the physical quantity, the capacitance of the capacitor is measured with one of the control signals having a first frequency which is much higher or much lower than the resonant frequency, and
   wherein, in a self-diagnosis of the sensor, the capacitance of the capacitor is measured with another one of the control signals having a second frequency which is equal or close to the resonant frequency.

2. The sensor of claim 1, wherein the capacitor comprises:
   a fixed electrode; and a movable electrode arranged to face the fixed electrode with a gap therebetween, the movable electrode being displaced with a variation in the physical quantity.

3. The sensor of claim 1, wherein the physical quantity is a pressure.

4. The sensor of claim 1, wherein the capacitor is formed by a surface micro electro mechanical systems (MEMS) process.

5. The sensor of claim 1, wherein the capacitor and the capacitance-voltage conversion circuit are formed on the same semiconductor substrate.

6. The sensor of claim 1, further comprising a boosting circuit,
wherein the capacitance of the capacitor is measured under the condition that a bias voltage boosted by the boosting circuit is applied to the capacitor.

7. The sensor of claim 1, further comprising a heater installed around the capacitor,
wherein the capacitance of the capacitor is measured under the condition that the capacitor is heated by the heater.

8. A sensor comprising:
a capacitor having a capacitance varying with a physical quantity;
a capacitance-voltage conversion circuit that converts the capacitance of the capacitor into a voltage; and
a control signal generation circuit that generates a plurality of control signals,
wherein the capacitor has a frequency-capacitance characteristic with a resonant frequency,
wherein a first measurement is performed to measure the capacitance of the capacitor with one of the control signals having a first frequency which is much higher or much lower than the resonant frequency, and
wherein, when a result of the first measurement is beyond a standard range or a deviation thereof is beyond a standard range, or when the first measurement has been performed a predetermined number of times, a second measurement is performed to measure the capacitance of the capacitor with another one of the control signals having a second frequency which is equal or close to the resonant frequency.

9. The sensor of claim 8, further comprising a boosting circuit,
wherein, when a result of the second measurement is beyond a standard range, a third measurement is performed to measure the capacitance of the capacitor under the condition that a bias voltage boosted by the boosting circuit is applied to the capacitor.

10. The sensor of claim 9, further comprising a heater installed around the capacitor,
wherein, when a result of the third measurement is beyond a standard range, a fourth measurement is performed to measure the capacitance of the capacitor under the condition that the capacitor is heated by the heater.

11. A sensor module comprising:
a capacitor having a capacitance varying with a pressure in a tire;
a capacitance-voltage conversion circuit that converts the capacitance of the capacitor into a voltage;
a control signal generation circuit that generates a plurality of control signals; and
a constant voltage source for driving the capacitance-voltage conversion circuit and control signal generation circuit,
wherein the capacitor has a frequency-capacitance characteristic with a resonant frequency,
wherein a first measurement is performed to measure the capacitance of the capacitor with one of the control signals having a first frequency which is much higher or much lower than the resonant frequency, and
wherein, when a result of the first measurement is beyond a standard range and a deviation thereof is beyond a standard range, or when the first measurement has been performed a predetermined number of times, a second measurement is performed to measure the capacitance of the capacitor with another one of the control signals having a second frequency which is equal or close to the resonant frequency.

12. The sensor module of claim 11, wherein the sensor module has a package structure, the package structure including:
a semiconductor chip on which at least the capacitor and the capacitance-voltage conversion circuit are formed; and
a battery which is the constant voltage source.

13. The sensor module of claim 11, wherein the capacitor comprises:
a fixed electrode; and
a movable electrode arranged to face the fixed electrode with a gap therebetween, the movable electrode being displaced with a variation in physical quantity.

14. The sensor module of claim 11, wherein the capacitor is formed by a surface MEMS process.

15. The sensor module of claim 11, further comprising a boosting circuit,
wherein, when a result of the second measurement is beyond a standard range, a third measurement is performed to measure the capacitance of the capacitor under the condition that a bias voltage boosted by the boosting circuit is applied to the capacitor.

16. The sensor module of claim 15, further comprising a heater installed around the capacitor,
wherein, when a result of the third measurement is beyond a standard range, a fourth measurement is performed to measure the capacitance of the capacitor under the condition that the capacitor is heated by the heater.

* * * * *